United States Patent
Jung et al.

(10) Patent No.: US 6,894,407 B2
(45) Date of Patent: May 17, 2005

(54) RECIPROCATING MOTOR

(75) Inventors: Won-Hyun Jung, Gyungsangnam-Do (KR); Bon-Cheol Ku, Gyungsangnam-Do (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 10/477,855

(22) PCT Filed: May 13, 2002

(86) PCT No.: PCT/KR02/00889

§ 371 (c)(1),
(2), (4) Date: Nov. 13, 2003

(87) PCT Pub. No.: WO02/093719

PCT Pub. Date: Nov. 21, 2002

(65) Prior Publication Data

US 2004/0145248 A1 Jul. 29, 2004

(30) Foreign Application Priority Data

May 16, 2001 (KR) ........................ 2001-26751

(51) Int. Cl.[7] ............................................. H02K 33/18
(52) U.S. Cl. ...................................................... 310/13
(58) Field of Search ............................... 310/12–15, 17

(56) References Cited

U.S. PATENT DOCUMENTS

| 4,641,812 A | * | 2/1987 | Vanderlaan et al. | .......... 251/65 |
| 4,714,853 A | | 12/1987 | Palmero | ...................... 310/257 |
| 4,888,506 A | * | 12/1989 | Umehara et al. | .............. 310/13 |
| 5,546,469 A | * | 8/1996 | Donahoe | ..................... 381/152 |
| 5,596,311 A | * | 1/1997 | Bess et al. | ................ 340/384.7 |
| 5,757,091 A | * | 5/1998 | Sogabe et al. | ................. 310/12 |
| 5,783,893 A | | 7/1998 | Dade | ........................... 310/266 |
| 6,653,753 B1 | * | 11/2003 | Kawano et al. | ................ 310/14 |

FOREIGN PATENT DOCUMENTS

| EP | 0534613 A1 | * | 3/1993 | ............ G01B/9/02 |
| EP | 1344593 A2 | * | 9/2003 | ............ B22F/3/22 |
| JP | 62 118740 | | 5/1987 | .......... H02K/21/12 |
| JP | H06-091727 B | * | 11/1994 | .......... H02K/35/02 |

* cited by examiner

Primary Examiner—Darren Schuberg
Assistant Examiner—Judson H. Jones
(74) Attorney, Agent, or Firm—Ostrolenk, Faber, Gerb & Soffen, LLP

(57) ABSTRACT

A reciprocating motor is disclosed having a magnet frame (10) connected between a magnet (8) and an element to be reciprocally moved to transmit a reciprocal movement of the magnet (8) to the element, the magnet consisting of a first mounting unit (12) at which the magnet (8) is fixed and a second mounting unit (14) made of a different material with the first mounting unit (12), being connected to the first mounting (12), and with which the element is engaged. A portion of the magnet frame (10) where the magnet is fixed is made of a nonmetallic material to minimize a loss of flux generated from a winding coil (6).

12 Claims, 3 Drawing Sheets

RECIPROCATING MOTOR

TECHNICAL FIELD

The present invention relates to a reciprocating motor, and more particularly, to a reciprocating motor that is capable of minimizing a leakage of a magnetic field generated from a stator to thereby improve an efficiency of a motor.

BACKGROUND ART

In general, a reciprocating motor is constructed such that an outer stator and an inner stator are disposed with a certain interval and a rotor having a magnet is disposed between the outer stator and the inner stator so that when power is applied to a winding coil wound on the stator, the rotor is moved linearly and reciprocally owing to an interaction between the stator and the magnet.

The reciprocating motor is mainly used for a reciprocating compressor, of which a piston and the rotor are connected to reciprocally move the piston.

FIG. 1 is a half-sectional view of the reciprocating motor in accordance with a conventional art, and FIG. 2 is a perspective view of a rotor assembly of the reciprocating motor in accordance with the conventional art.

The conventional reciprocating motor includes: a stator assembly 102 fixed at a housing and forming a flux when power is applied thereto; and a rotor assembly 104 disposed with an air gap between itself and the stator assembly 102 and reciprocally moved according to an interaction with the flux generated from the stator assembly 102.

In this respect, the stator assembly 102 includes: an outer stator core 106 making a cylindrical form as a plurality of thin iron pieces are stacked; an inner stator core 108 disposed with a certain air gap between itself and an inner circumferential face of the outer stator core 106 and making a cylindrical form as a plurality of thin iron pieces are stacked; and a winding coil 110 wound inside the outer stator core 106 and forming a flux between the outer stator core 106 and the inner stator core 108 when power is applied thereto from an external source.

The rotor assembly 104 includes: a magnet 112 disposed in a circumferential direction between the outer stator 106 and the inner stator 108; a magnet frame 114 with a plurality of magnets 112 fixed at equal intervals at an outer circumferential face thereof and connected to an element (not shown) to be reciprocally moved; and a magnet cover 116 for covering the magnet 112 to prevent the magnet 112 from releasing from the magnet frame 114.

As shown in FIG. 2, the magnet frame 114 includes: a first mounting unit 120 disposed to be reciprocally movable between the outer stator core 106 and the inner stator core 108 and having a cylindrical form on which the magnet 112 is mounted at an equal interval in the circumferential direction; and a second mounting-unit 122 integrally formed with the same material at an end portion of the opposite side of the portion where the magnet 112 of the first mounting unit 120 is mounted so that an element to be reciprocally moved is mounted.

The first mounting 120 includes a plurality of insertion grooves 124 formed at its circumferential face at equal intervals into which the magnet 112 is inserted; and the second mounting unit 122 includes an engaging hole 126 in a disk type and an element such as a piston (not shown) is mounted in the circumferential direction.

The operation of the conventional reciprocating motor constructed as described above will now be explained.

When power is applied to the winding coil 110, the flux is formed around the winding coil 110. The flux forms a closed loop along the outer stator core 106 and the inner stator core 108, and the magnet 112 is linearly moved in an axial direction by the interaction between the flux formed between the outer stator core 106 and the inner stator core 108 and the flux formed by the magnet 112.

When the direction of the current applied to the winding coil 110 is changed in turn, the flux direction of the winding coil 110 is changed and the magnet 112 is linearly and reciprocally moved.

Then, as the magnet frame 114 with the magnet magnets 112 fixed thereto is linearly and reciprocally moved, the element such as the piston is linearly and reciprocally moved.

In this respect, since the magnet frame 114 should move the piston, or the like, reciprocally in a state that the magnets 112 are attached thereto, a certain strength is to be maintained in consideration of a stability of the motor, and thus, the magnet frame 114 is usually made of a metal material.

Especially, in order to reduce the air gap between the outer stator core 106 and the inner stator core 108, a non-magnetic metal is used.

However, in the case that the magnet frame 114 is made of a non-magnetic metal, since a conductivity still exists in terms of the characteristics of the metal, a magnetic field generated between the outer stator core 106 and the inner stator core 108 is leaked along the magnet frame 114, causing a problem of degradation of the performance of the motor.

If the magnet frame is made of a non-metallic material in view of solving such a problem, since the non-metallic material has a weak physical property compared to a metallic material in view of its characteristics, there is a limitation to form it to be thin and can be easily broken in the linear and reciprocal movement.

In addition, in molding the magnet frame, in order to facilitate to pull out the inner cast inserted into the magnet frame 114, there should be a pull-out draft. Then, however, the air gap between the outer stator core 106 and the inner stator core 108 is enlarged to degrade the efficiency of the motor.

DISCLOSURE OF THE INVENTION

Therefore, an object of the present invention is to provide a reciprocating motor that is capable of preventing efficiency degradation of a motor by forming a portion of a magnet frame at which a magnet is fixed with a non-metallic material to thereby minimize a loss of a flux generated from a winding coil.

Another object of the present invention is to provide a reciprocating motor in which a portion of a magnet frame to which an element to be reciprocally moved is engaged is made of a metallic material having a certain strength, thereby making it thin and maintaining a combination strength with the element.

Still another object of the present invention is to provide a reciprocating motor in which, in molding a magnet frame, no pull-out draft is required, so that the magnet frame can be formed with an even thickness, and an air gap between an outer stator core and an inner stator core is narrowed to thereby improve an efficiency of a motor.

To achieve these and other advantages and in accordance with the purpose of the present invention, as embodied and broadly described herein, there is provided a reciprocating motor having an outer stator core; an inner stator core disposed at an inner circumferential face of the outer stator core with a certain air gap therebetween; a winding coil wound on one of the outer stator core and the inner stator core; a magnet disposed to be linearly movable between the outer stator core and the inner stator core; and a magnet frame connected between the magnet and an element to be reciprocally moved to transmit the reciprocal movement of the magnet to the element, wherein the magnet frame comprising: a first mounting unit at which the magnet is fixed; and a second mounting unit to be connected to the first mounting unit, being made of a different material from that of the first mounting unit, with which the element is engaged.

In the reciprocating motor of the present invention, the first mounting unit is made of a non-metallic material.

In the reciprocating motor of the present invention, the first mounting unit is made by mixing a fiber and a resin.

In the reciprocating motor of the present invention, the first mounting unit has a cylindrical form and includes insertion grooves in which the magnet is inserted in an outer circumferential direction.

In the reciprocating motor of the present invention, the first mounting unit includes a plurality of air passes formed in the circumferential direction.

In the reciprocating motor of the present invention, the first mounting unit has a length more than twice the air gap at the side of the outer stator core when the magnet is positioned at a top dead center or at a bottom dead center.

In the reciprocating motor of the present invention, the second mounting unit is made of a metallic material.

In the reciprocating motor of the present invention, the second mounting unit is fabricated by injection-molding a cold-rolled plate made as a sheet metal.

In the reciprocating motor of the present invention, the second mounting unit has a cylindrical form engaged with the marginal circumferential side of the first mounting unit and includes a plurality of engaging holes formed at the opposite side of the portion engaged with the first mounting unit, for an engagement with the element.

In the reciprocating motor of the present invention, a plurality of air passes are formed at the circumferential face of the second mounting unit.

In the reciprocating motor of the present invention, as for the engaging unit with the first mounting unit and the second mounting unit mutually engaged, a first step portion is formed at an inner circumferential side of the first mounting unit, facing the second mounting unit, and a second step portion is formed at an outer circumferential side of the second mounting unit, and then, the first step portion and the second step portion are mutually inserted to be assembled.

In the reciprocating motor of the present invention, the first mounting unit and the second mounting unit are combined by a bolt or an adhesive material.

In the reciprocating motor of the present invention, the first mounting unit and the second mounting unit are combined in a manner that the second mounting unit is insert-molded in molding the first mounting unit.

MODE FOR CARRYING OUT THE PREFERRED EMBODIMENTS

Reference will now be made in detail to the preferred embodiments of the present invention, examples of which are illustrated in the accompanying drawings.

There may exist a plurality of embodiments of a reciprocating motor in accordance with the present invention, of which the most preferred one will now be described.

Figure 1:
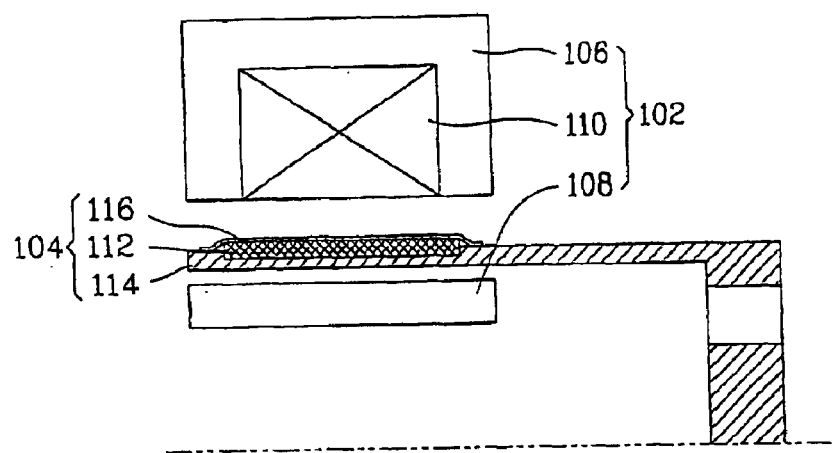
FIG. 1 is a half-sectional view of a reciprocating motor in accordance with a conventional art.
Figure 2:
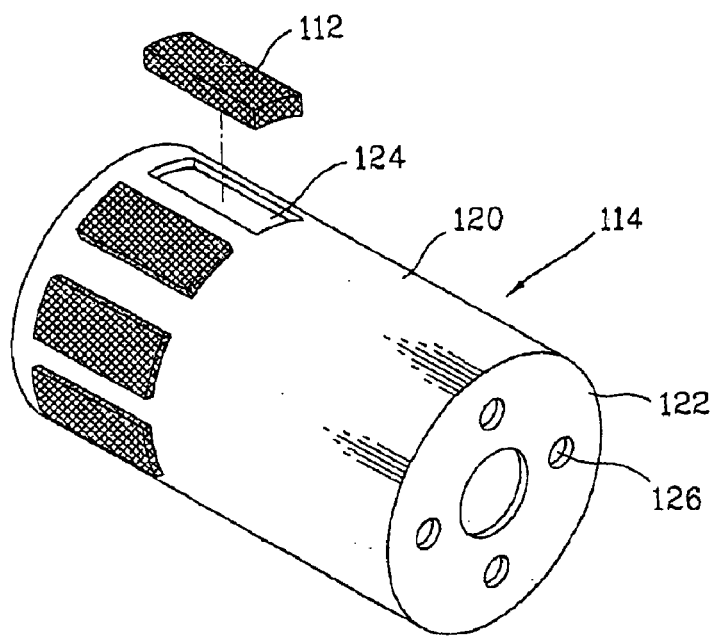
FIG. 2 is a perspective view of a rotor frame of the reciprocating motor in accordance with the conventional art.
Figure 3:
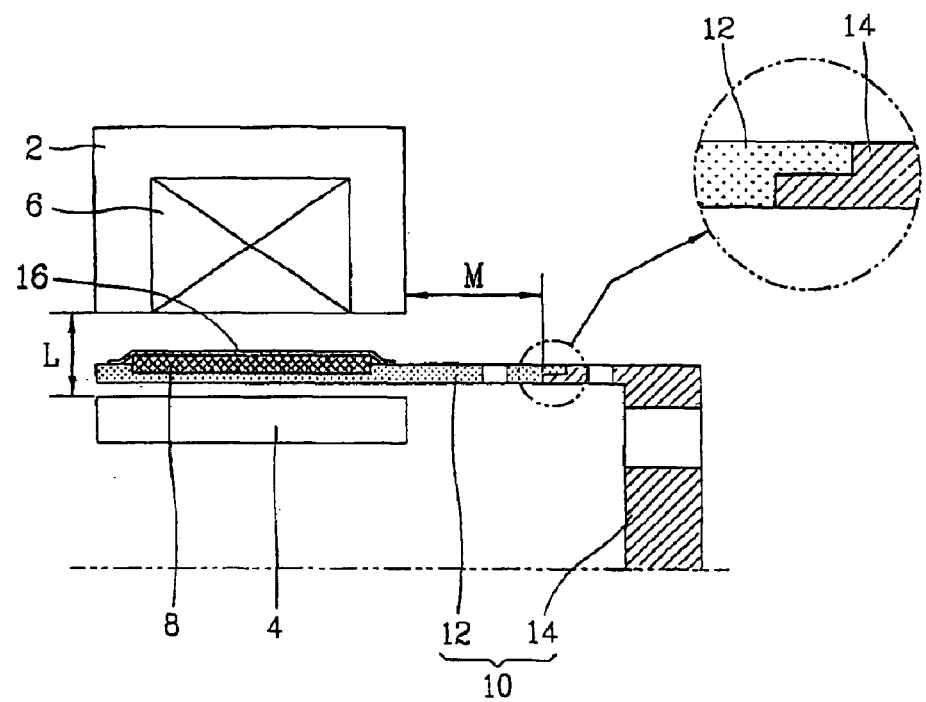
FIG. 3 is a half-sectional view of a reciprocating motor in accordance with the present invention.

FIG. 3 is a half-sectional view of a reciprocating motor in accordance with the present invention.

The reciprocating motor of the present invention includes: an outer stator core 2 in a cylindrical form fixed at a housing (not shown); an inner stator core (4) disposed at an inner circumferential face of the outer stator 2 with a certain air gap therebetween and forming a flux between itself and the outer stator core 2; a winding coil 6 wound inside the outer stator core 2; a magnet 8 disposed to be linearly movable between the outer stator core 2 and the inner stator core 4; and a magnet frame 10 connected between the magnet 8 and an element (not shown) to be reciprocally moved to transmit a reciprocal movement of the magnet 8 to the element.

For example, the element signifies a piston that is linearly and reciprocally moved for a compression operation, in case that the reciprocating motor is adopted for a reciprocating compressor.

The outer stator core 2 has a cylindrical form by stacking several iron pieces and the winding coil 6 is wound at the inner circumferential face, and the inner stator core 4 has a cylindrical form by stacking several iron pieces and is disposed at the inner side of the outer stator core 2 with a certain air gap therebetween.

The magnet 8 is of a form of being divided into plural ones in the circumferential direction of the air gap between the outer stator core 2 and the inner stator core 4 and fixed to the magnet frame 10.

In order to prevent the magnet 8 from releasing, a magnet cover 16 is attached at the outer side of the magnet 8.

Figure 4:
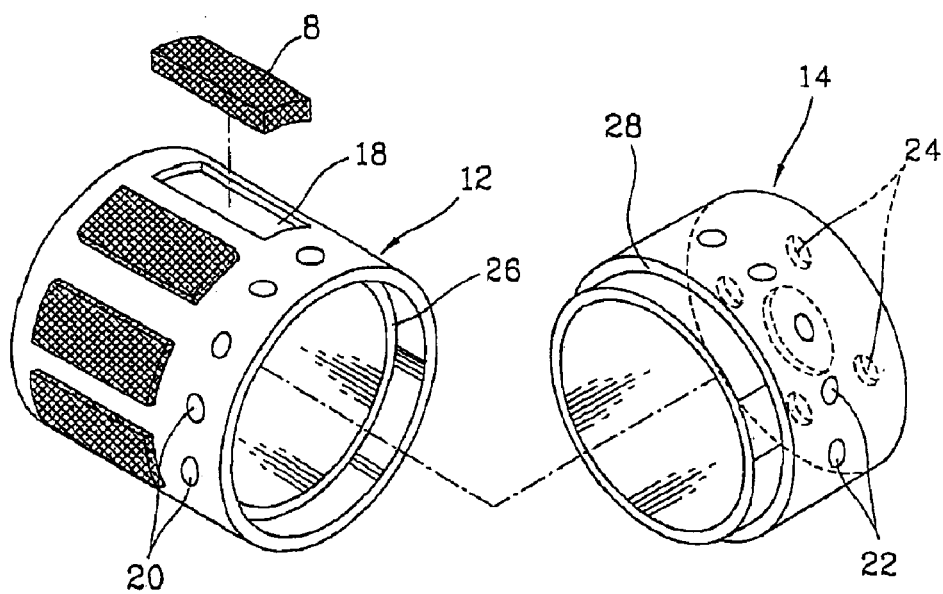
FIG. 4 is an exploded perspective view of a rotor frame of the reciprocating motor in accordance with the present invention.

As shown in FIG. 4, the magnet frame 10 includes a first mounting unit 12 disposed in the air gap between the outer stator core 2 and the inner stator core 4, and having a magnet 8 mounted therein; and a second mounting unit 14 engaged at an end portion of the first mounting unit 12, fixed at the element to be reciprocally moved, and made of a different material from that of the first mounting unit 12.

The first mounting unit 12 has a cylindrical form with a certain thickness and includes insertion grooves 18 formed at certain intervals in which the magnet 8 is inserted in the outer circumferential direction.

The plurality of air passes 20 are penetratingly formed in the circumferential direction at the first mounting unit 12 with certain intervals from the insertion grooves 18.

The first mounting unit 12 is made of a non-metallic material having a non-conductivity so as to reduce the loss of the flux generated between the outer stator core 2 and the inner stator core 4 by the winding coil 6.

Especially, the first mounting unit 12 is preferably injection-molded by mixing a fiber and a resin in consideration of the strength supporting the magnet 8 and the loss of flux.

The second mounting unit 14 is engaged at the marginal circumferential face of the first mounting unit 12 by an engaging unit and has a cylindrical form having the same diameter with the first mounting unit 12. A plurality of air passes 22 are formed in the circumferential direction at the second mounting unit 14, and a plurality of engaging holes 24 are formed for engagement with the element at the opposite side of the portion engaged with the first mounting unit 12.

The second mounting unit 14 is made of a metallic material that can tolerate the engagement with the element and the reciprocal movement.

Especially, the second mounting unit 14 is preferably fabricated by cold-rolling an injection molded plate as a sheet metal.

It is generally known that, when the magnet 8 is positioned at a top dead center or at a bottom dead center, it is not affected by a magnetic field from a distance that is twice the air gap between the outer stator core 2 and the inner stator core 4 at the side of the outer stator core 2.

Accordingly, the first mounting unit 12 has the length (M) double the air gap (L) at the side of the outer stator core 2 when the magnet 8 is slanted rightwardly when viewed from FIG. 3.

As for the first and second mounting units 14, since the length fabricated in the injection-molding is short, they can be easily separated from the cast even without a pull-out draft.

The engaging unit is formed by the first mounting unit 12 and the second mounting unit 14 in such a manner that a first step portion 26 is formed by denting at a certain width the inner circumferential side of the first mounting unit 12, facing the second mounting unit 14, and a second step portion 28 is formed at the second mounting unit 14 by denting at a certain width the outer circumferential side so as to be inserted into the first step portion 26.

After the first step portion 26 and the second step portion 28 are mutually inserted and assembled, they are fixed by using a bolt or an adhesive material.

Figure 5:
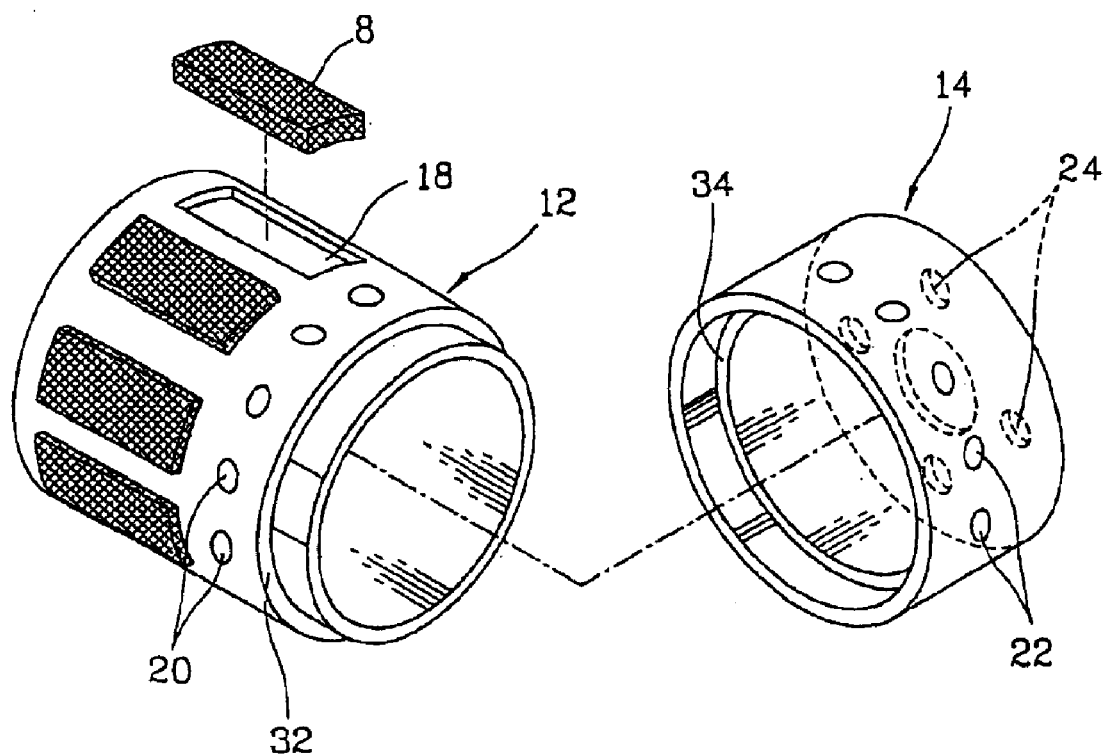
FIG. 5 is a half-sectional view showing a different embodiment of the rotor frame of the reciprocating motor in accordance with the present invention.

As shown in FIG. 5, the engaging unit is formed in such a manner that a first step portion 32 formed by denting at a certain width the outer circumferential side of the first mounting unit 12, facing the second mounting unit 14, and a second step portion 34 is formed by denting at a certain width the inner circumferntial side of the second mounting unit 14 so as to be inserted into the first step portion 32.

After the first step portion 32 and the second step portion 34 are mutually inserted and assembled, they can be fixed by using a bolt or an adhesive material.

Besides, the second mounting 14, the metallic material, can be inserted in molding the first mounting unit 12, the non-metallic material, to thereby combining them.

The engaging unit can adopt any engaging method as far as it allows the cylindrical metallic material and the cylindrical non-metallic material to be mutually engaged.

The operation of the reciprocating motor constructed as described above will now be explained.

When power is applied to the winding coil 6, a flux is formed around the winding coil 6. The flux forms a closed loop along the outer stator core 2 and the inner stator core 4, and the magnet 8 is linearly moved in an axial direction owing to the interaction between the flux formed between the outer stator core 2 and the inner stator core 4 and the flux formed by the magnet 8.

And, when the direction of the current applied to the winding coil 6 is changed in turn, the flux direction of the winding coil 6 is changed and the magnet 8 is linearly and reciprocally moved.

Then, as the magnet frame with the magnet 8 fixed therein is linearly and reciprocally moved, the element such as the piston or the like is linearly and reciprocally moved.

At this time, since the first mounting unit 12 of the magnet frame 10 where the magnet 8 is fixed is formed as a non-metallic material, the loss of flux generated from the winding coil 6 can be minimized.

In addition, since the second mounting unit 14 of the magnet frame 10 where the element is engaged is made of the metallic material, the strength in the engagement with the element can be maintained.

As so far described, the reciprocating motor of the present invention has many advantages.

That is, for example, first, since the first mounting unit 12 of the magnet frame 10 where the magnet 8 is fixed is made of the non-metallic material, the loss of flux generated from the winding coil 6 can be minimized; and thus, an efficiency degradation of the motor can be prevented.

Secondly, since the second mounting unit 14 of the magnet frame engaged with the element to be reciprocally moved is made of a metallic material having a certain strength, its thickness can be reduced and the combination strength with the element can be maintained.

Thirdly, since the first mounting unit 12 and the second mounting 14 are separately injection-molded and mutually engaged, a pull-out draft is not necessary for the injection molding. Thus, the magnet frame 10 can be formed with an even thickness, and since the air gap between the outer stator core 2 and the inner stator core 4 can be narrowed, the efficiency of the motor can be improved.

Lastly, since the magnet frame 10 is fabricated by combining the metallic material and the non-metallic material, a fabrication cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. A reciprocating motor having an outer stator core; an inner stator core disposed at an inner circumferential face of the outer stator core with a certain air gap therebetween; a winding coil wound on one of the outer stator core and the inner stator core; a magnet linearly movable between the outer stator core and the inner stator core; and a magnet frame connected between the magnet and an element reciprocally movable to transmit the reciprocal movement of the magnet to the element, wherein the magnet frame comprises: a first mounting unit at which the magnet is fixed; and a second mounting unit connected to the first mounting unit, and engaged with the element, wherein the first mounting unit is made of a non-metallic material and the second mounting unit is made of a metallic material.

2. The motor of claim 1, wherein the first mounting unit is made by mixing a fiber and a resin.

3. The motor of claim 1, wherein the first mounting unit has a cylindrical form and includes insertion grooves in which the magnet is inserted in an outer circumferential direction.

4. The motor of claim 3, wherein the first mounting unit includes a plurality of air passes formed in the circumferential direction.

5. The motor of claim 3, wherein the first mounting unit has a length more than twice the air gap at the side of the outer stator core when the magnet is positioned at a top dead center or at a bottom dead center.

6. The motor of claim 1, wherein the second mounting unit is fabricated by cold-rolling an injection molded plate as a sheet metal.

7. The motor of claim 1, wherein the second mounting unit has a cylindrical form engaged with the marginal circumferential side of the first mounting unit and includes a plurality of engaging holes formed at the opposite side of the portion engaged with the first mounting unit, for an engagement with the element.

8. The motor of claim 7, wherein a plurality of air passes are formed at the circumferential face of the second mounting unit.

9. The motor of claim 1, wherein the first mounting unit and the second mounting unit are assembled in such a manner that a first step portion is formed at an inner circumferential side of the first mounting unit, facing the second mounting unit, a second step portion is formed at an outer circumferential side of the second mounting unit, and the first step portion and the second step portion are mutually inserted.

10. The motor of claim 1, wherein the first mounting unit and the second mounting unit are assembled in such a manner that a first step portion is formed at an outer circumferential side of the first mounting unit, facing the second mounting unit, a second step portion is formed at an inner circumferential side of the second mounting unit, and the first step portion and the second step portion are mutually inserted.

11. The motor of claim 10, wherein the first mounting unit and the second mounting unit are combined by a bolt or an adhesive material.

12. The motor of claim 1, wherein the first mounting unit and the second mounting unit are combined in a manner that the second mounting unit is insert-molded in molding the first mounting unit.

* * * * *